United States Patent
Lee et al.

(10) Patent No.: US 11,690,077 B2
(45) Date of Patent: Jun. 27, 2023

(54) METHOD AND APPARATUS FOR TRANSMITTING/RECEIVING WIRELESS SIGNAL IN WIRELESS COMMUNICATION SYSTEM

(71) Applicant: LG Electronics Inc., Seoul (KR)

(72) Inventors: Youngdae Lee, Seoul (KR); Jiwon Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 40 days.

(21) Appl. No.: 17/396,122

(22) Filed: Aug. 6, 2021

(65) Prior Publication Data

US 2022/0046613 A1 Feb. 10, 2022

Related U.S. Application Data

(60) Provisional application No. 63/062,363, filed on Aug. 6, 2020.

(51) Int. Cl.
*H04W 72/23* (2023.01)

(52) U.S. Cl.
CPC .................................. *H04W 72/23* (2023.01)

(58) Field of Classification Search
CPC ...................................................... H04W 72/042
See application file for complete search history.

(56) References Cited

U.S. PATENT DOCUMENTS

| | | | |
|---|---|---|---|
| 2018/0145839 A1* | 5/2018 | Lee | H04L 12/189 |
| 2019/0174529 A1* | 6/2019 | Tie | H04W 76/11 |
| 2020/0221429 A1* | 7/2020 | Li | H04L 5/0053 |

FOREIGN PATENT DOCUMENTS

JP WO2020032693 * 2/2020

* cited by examiner

*Primary Examiner* — Ronald B Abelson
(74) *Attorney, Agent, or Firm* — Fish & Richardson P.C.

(57) ABSTRACT

According to an embodiment of the present invention, a UE may receive configuration information for CORESETs associated with different SSBs respectively, select at least one CORESET, and receive DCI by monitoring PDCCH candidates on the selected at least one CORESET. A CRC of the DCI can be scrambled with a G-RNTI selected by the UE in accordance with an identifier of a specific service to receive. Two or more of the CORSETs may be commonly associated with the same G-RNTI.

13 Claims, 13 Drawing Sheets

Non - interleaved CCE - to - REG mapping

Same TB Tx based on different overlapping PDSCHs and different DCIs

Same TB Tx based on different non-overlapping PDSCHs and different DCIs

METHOD AND APPARATUS FOR TRANSMITTING/RECEIVING WIRELESS SIGNAL IN WIRELESS COMMUNICATION SYSTEM

CROSS-REFERENCE TO RELATED APPLICATIONS

This application claims the benefit of U.S. Provisional Application No. 63/062,363, filed on Aug. 6, 2020, which is hereby incorporated by reference as if fully set forth herein.

TECHNICAL FIELD

The present disclosure relates to a wireless communication system, and more particularly, to a method and apparatus for transmitting/receiving a wireless signal.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

SUMMARY

An object of the present disclosure is to provide a method of efficiently performing wireless signal transmission/reception procedures and an apparatus therefor.

It will be appreciated by persons skilled in the art that the objects and advantages that could be achieved with the present disclosure are not limited to what has been particularly described hereinabove and the above and other objects and advantages that the present disclosure could achieve will be more clearly understood from the following detailed description.

In an aspect of the present invention, a method of receiving a signal by a user equipment (UE) in a wireless communication system, may comprise receiving configuration information for a plurality of control resource sets (CORESETs) associated with different synchronization signal blocks (SSBs), respectively; selecting at least one of the plurality of CORESETs based on a SSB measurement; and receiving downlink control information (DCI) by monitoring physical downlink control channel (PDCCH) candidates on the selected at least one CORESET. A cyclic redundancy check (CRC) of the DCI can be scrambled with a group-radio network temporary identifier (G-RNTI) which has been selected by the UE in accordance with an identifier of a specific service to receive. And at least two or more of the plurality of CORSETs can be commonly associated with the same G-RNTI selected by the UE, for the specific service.

The DCI with the CRC scrambled with the G-RNTI, may be configured to indicate a plurality of transmission configuration index (TCI) states at once.

The UE may select one of the plurality of TCI states based on based on the DCI indicating the plurality of TCI states, and receive a corresponding physical downlink shared channel (PDSCH) based on the selected TCI state.

The UE may select at least one SSB based on a threshold related to the SSB measurement. The at least one CORESET may be associated with the at least one SSB selected by the UE. The threshold may be a configurable parameter indicated by a base station, or a value predefined in the wireless communication system.

The UE may select a best SSB for the UE from among the different SSBs. The at least one CORESET selected by the UE may be associated with the best SSB.

According to other aspect of the present invention, a non-transitory computer readable medium recorded thereon program codes for performing the aforementioned method is presented.

According to another aspect of the present invention, the UE configured to perform the aforementioned method is presented.

According to another aspect of the present invention, a device configured to control the UE to perform the aforementioned method is presented.

In other aspect of the present invention, a method of transmitting a signal by a base station in a wireless communication system, may comprise transmitting, to a user equipment (UE), configuration information for a plurality of control resource sets (CORESETs) associated with different synchronization signal blocks (SSBs), respectively, and transmitting, to the UE, downlink control information (DCI) based on physical downlink control channel (PDCCH) candidates on at least one of the plurality of CORESETs. A cyclic redundancy check (CRC) of the DCI may be scrambled with a group-radio network temporary identifier (G-RNTI) in accordance with an identifier of a specific service to transmit. And at least two or more of the plurality of CORSETs may be commonly associated with the same G-RNTI, for the specific service.

The DCI with the CRC scrambled with the G-RNTI, may be configured to indicate a plurality of transmission configuration index (TCI) states at once.

The base station may transmit a corresponding physical downlink shared channel (PDSCH) based on each TCI state.

The base station may receive, from the UE, information regarding at least one SSB selected by the UE based on a threshold. The at least one CORESET may be associated with the at least one SSB selected by the UE. The threshold may be a configurable parameter determined by the base station, or a value predefined in the wireless communication system.

The base station may receive, from the UE, information regarding a best SSB for the UE from among the different SSBs. The at least one CORESET selected by the UE may be associated with the best SSB.

DETAILED DESCRIPTION

Figure 1:
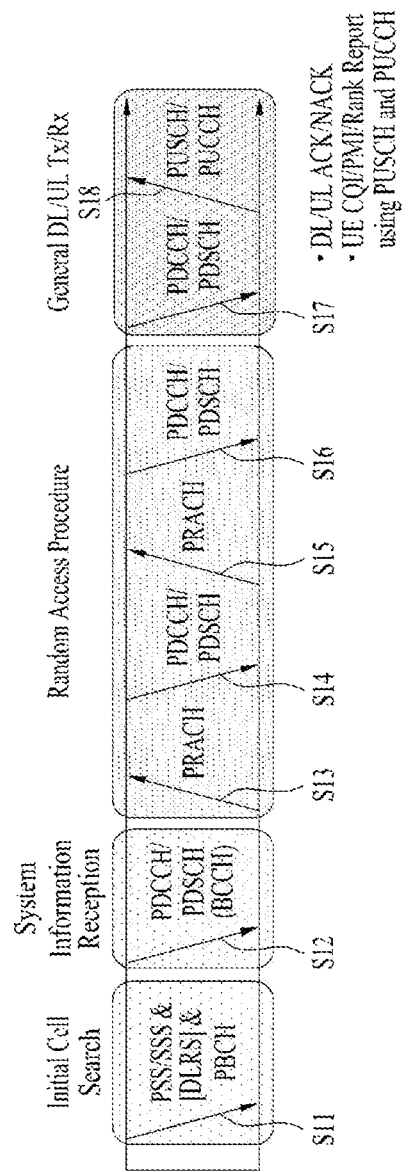
FIG. 1 illustrates physical channels used in a 3rd generation partnership project (3GPP) system, which is an example of wireless communication systems, and a general signal transmission method using the same.

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

Details of the background, terminology, abbreviations, etc. used herein may be found in 3GPP standard documents published before the present disclosure.

Following Documents are Incorporated by Reference:
3GPP LTE
TS 36.211: Physical channels and modulation
TS 36.212: Multiplexing and channel coding
TS 36.213: Physical layer procedures
TS 36.300: Overall description
TS 36.321: Medium Access Control (MAC)
TS 36.331: Radio Resource Control (RRC)
3GPP NR
TS 38.211: Physical channels and modulation
TS 38.212: Multiplexing and channel coding
TS 38.213: Physical layer procedures for control
TS 38.214: Physical layer procedures for data
TS 38.300: NR and NG-RAN Overall Description
TS 38.321: Medium Access Control (MAC)
TS 38.331: Radio Resource Control (RRC) protocol specification
Abbreviations and Terms
PDCCH: Physical Downlink Control CHannel
PDSCH: Physical Downlink Shared CHannel
PUSCH: Physical Uplink Shared CHannel
CSI: Channel state information
RRM: Radio resource management
RLM: Radio link monitoring
DCI: Downlink Control Information
CAP: Channel Access Procedure
Ucell: Unlicensed cell
PCell: Primary Cell
PSCell: Primary SCG Cell
TBS: Transport Block Size
SLIV: Starting and Length Indicator Value
BWP: BandWidth Part
CORESET: COntrol REsourse SET
REG: Resource element group
SFI: Slot Format Indicator
COT: Channel occupancy time
SPS: Semi-persistent scheduling
PLMN ID: Public Land Mobile Network identifier
RACH: Random Access Channel
RAR: Random Access Response
Msg3: Message transmitted on UL-SCH containing a C-RNTI MAC CE or CCCH SDU, submitted from upper layer and associated with the UE Contention Resolution Identity, as part of a Random Access procedure.
Special Cell: For Dual Connectivity operation the term Special Cell refers to the PCell of the MCG or the PSCell of the SCG depending on if the MAC entity is associated to the MCG or the SCG, respectively. Otherwise the term Special Cell refers to the PCell. A Special Cell supports PUCCH transmission and contention-based Random Access, and is always activated.
Serving Cell: A PCell, a PSCell, or an SCell In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
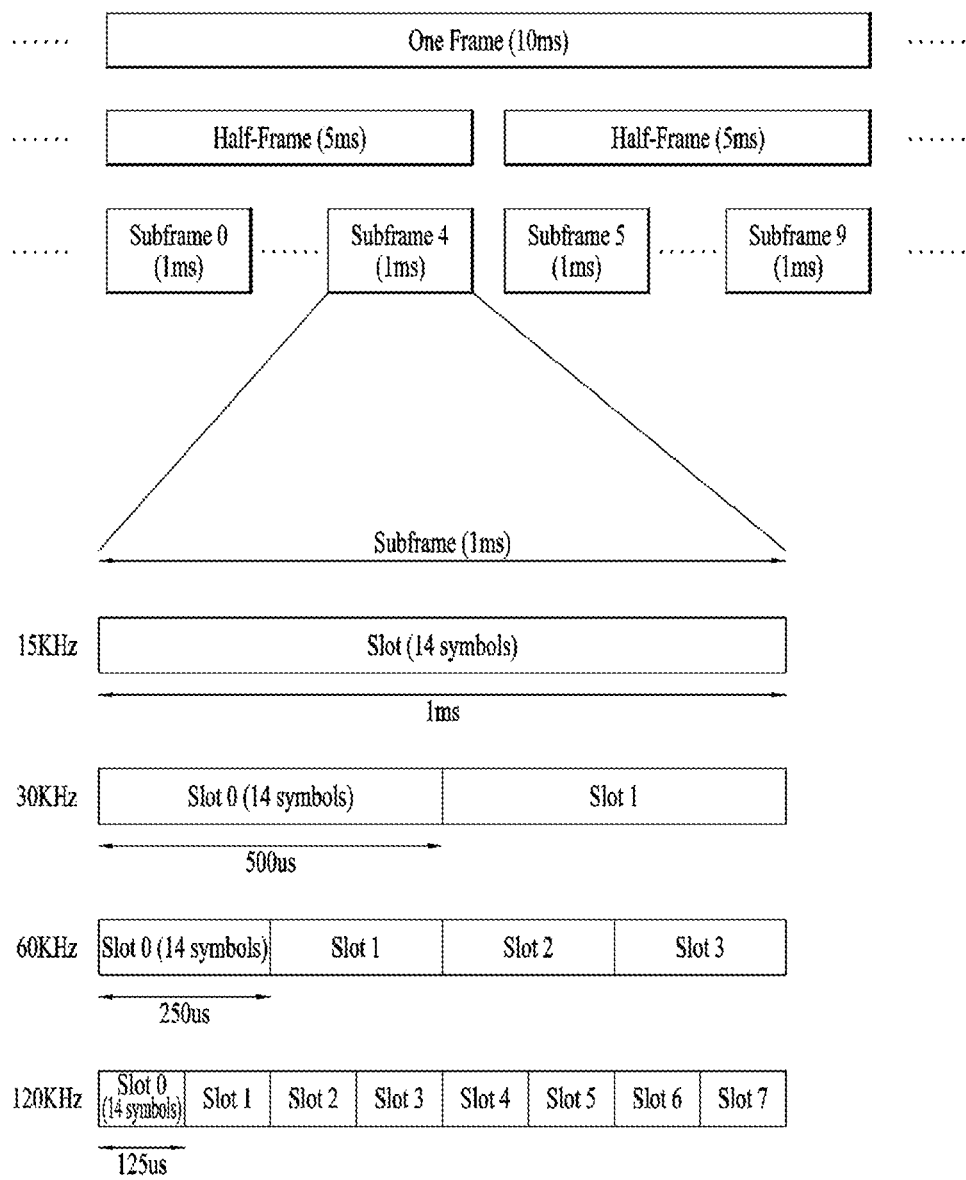
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS (15 * $2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |

TABLE 1-continued

| SCS (15 * $2^u$) | $N^{slot}_{symb}$ | $N^{frame,u}_{slot}$ | $N^{subframe,u}_{slot}$ |
|---|---|---|---|
| 120 KHz (u = 3) | 14 | 80 | 8 |
| 240 KHz (u = 4) | 14 | 160 | 16 |

* $N^{slot}_{symb}$: Number of symbols in a slot
* $N^{frame,u}_{slot}$: Number of slots in a frame
* $N^{subframe,u}_{slot}$: Number of slots in a subframe Table 2 illustrates that the number of symbols per slot, the number of slots per frame, and the number of slots per subframe vary according to the SCS when the extended CP is used.

TABLE 2

| SCS (15 * $2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
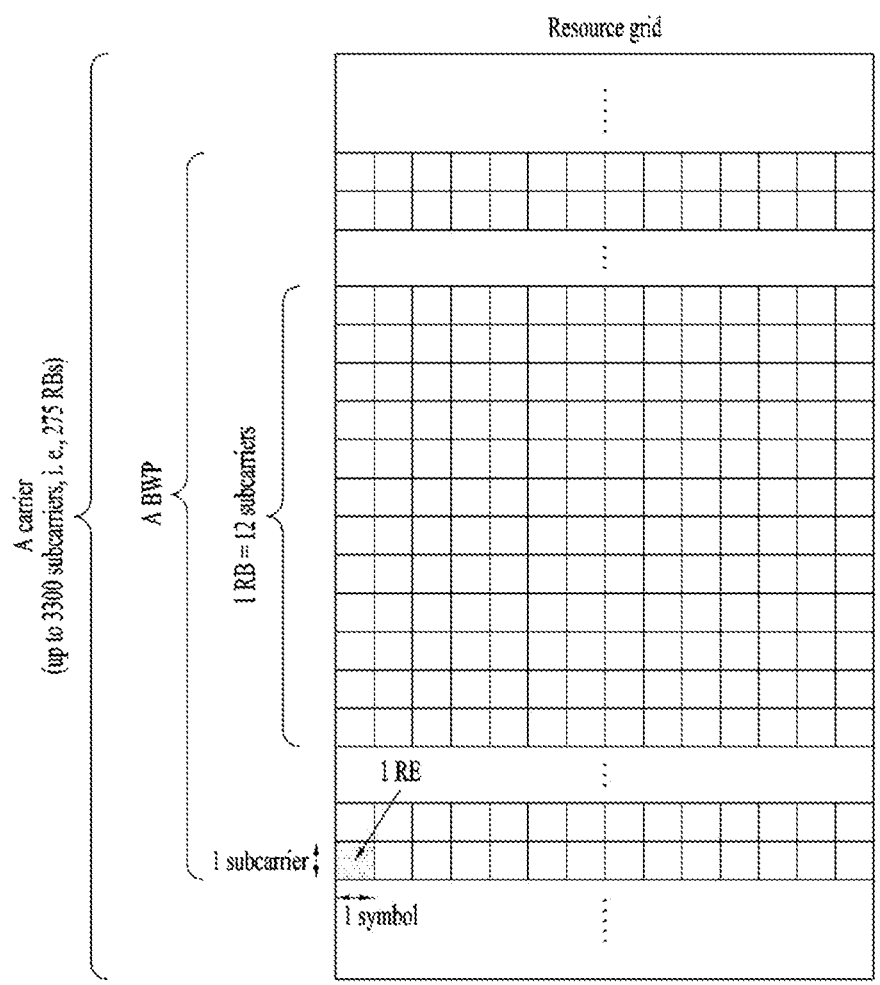
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
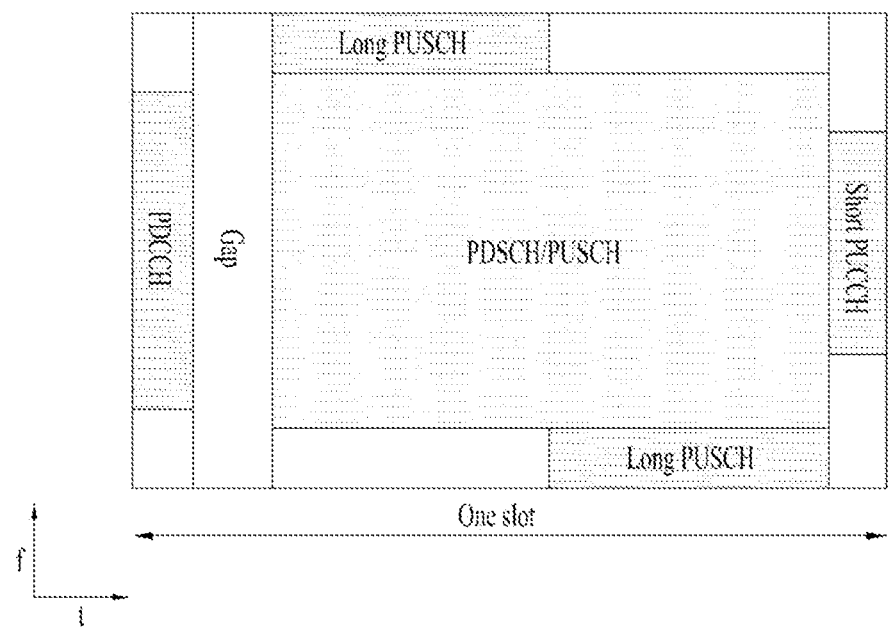
FIG. 4 illustrates exemplary mapping of physical channels in a slot.

FIG. 4 illustrates exemplary mapping of physical channels in a slot. In the NR system, a frame is characterized by a self-contained structure in which all of a DL control channel, DL or UL data, and a UL control channel may be included in one slot. For example, the first N symbols (hereinafter, referred to as a DL control region) of a slot may be used to transmit a DL control channel (e.g., PDCCH), and the last M symbols (hereinafter, referred to as a UL control region) of the slot may be used to transmit a UL control channel (e.g., PUCCH). Each of N and M is an integer equal to or larger than 0. A resource region (hereinafter, referred to as a data region) between the DL control region and the UL control region may be used to transmit DL data (e.g., PDSCH) or UL data (e.g., PUSCH). A guard period (GP) provides a time gap for transmission mode-to-reception mode switching or reception mode-to-transmission mode switching at a BS and a UE. Some symbol at the time of DL-to-UL switching in a subframe may be configured as a GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

Figure 5:
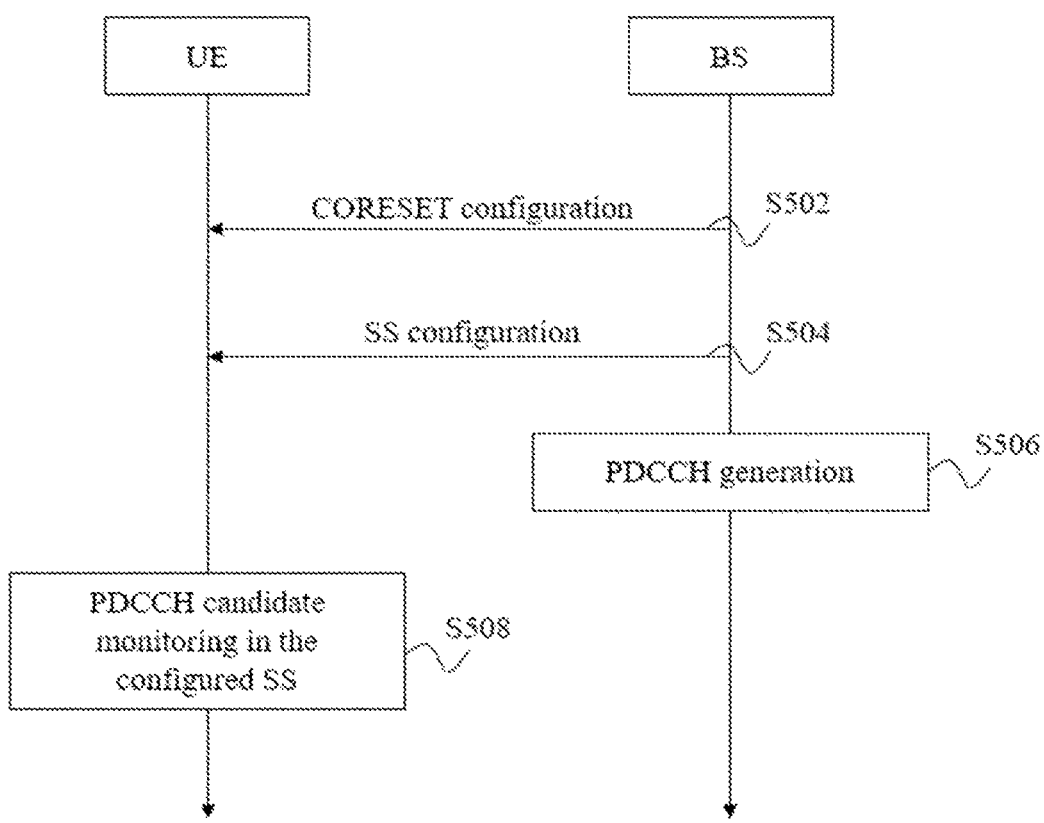
FIG. 5 is a diagram illustrating a signal flow for a physical downlink control channel (PDCCH) transmission and reception process.

FIG. 5 is a diagram illustrating a signal flow for a PDCCH transmission and reception process.

Referring to FIG. 5, a BS may transmit a control resource set (CORESET) configuration to a UE (S502). A CORSET is defined as a resource element group (REG) set having a given numerology (e.g., an SCS, a CP length, and so on). An REG is defined as one OFDM symbol by one (P)RB. A plurality of CORESETs for one UE may overlap with each other in the time/frequency domain. A CORSET may be configured by system information (e.g., a master information block (MIB)) or higher-layer signaling (e.g., radio resource control (RRC) signaling). For example, configuration information about a specific common CORSET (e.g., CORESET #0) may be transmitted in an MIB. For example, a PDSCH carrying system information block 1 (SIB1) may be scheduled by a specific PDCCH, and CORSET #0 may be used to carry the specific PDCCH. Configuration information about CORESET #N (e.g., N>0) may be transmitted by RRC signaling (e.g., cell-common RRC signaling or UE-specific RRC signaling). For example, the UE-specific RRC signaling carrying the CORSET configuration information may include various types of signaling such as an RRC setup message, an RRC reconfiguration message, and/or BWP configuration information. Specifically, a CORSET configuration may include the following information/fields.

controlResourceSetId: indicates the ID of a CORESET.
frequencyDomainResources: indicates the frequency resources of the CORESET. The frequency resources of the CORESET are indicated by a bitmap in which each bit corresponds to an RBG (e.g., six (consecutive) RBs). For example, the most significant bit (MSB) of the bitmap corresponds to a first RBG. RBGs corresponding to bits set to 1 are allocated as the frequency resources of the CORESET.
duration: indicates the time resources of the CORESET. Duration indicates the number of consecutive OFDM symbols included in the CORESET. Duration has a value of 1 to 3.
cce-REG-MappingType: indicates a control channel element (CCE)-REG mapping type. Interleaved and non-interleaved types are supported.
interleaverSize: indicates an interleaver size.
pdcch-DMRS-ScramblingID: indicates a value used for PDCCH DMRS initialization. When pdcch-DMRS-ScramblingID is not included, the physical cell ID of a serving cell is used.
precoderGranularity: indicates a precoder granularity in the frequency domain.
reg-BundleSize: indicates an REG bundle size.
tci-PresentInDCI: indicates whether a transmission configuration index (TCI) field is included in DL-related DCI.
tci-StatesPDCCH-ToAddList: indicates a subset of TCI states configured in pdcch-Config, used for providing quasi-co-location (QCL) relationships between DL RS(s) in an RS set (TCI-State) and PDCCH DMRS ports.

Further, the BS may transmit a PDCCH search space (SS) configuration to the UE (S504). The PDCCH SS configuration may be transmitted by higher-layer signaling (e.g., RRC signaling). For example, the RRC signaling may include, but not limited to, various types of signaling such as an RRC setup message, an RRC reconfiguration message, and/or BWP configuration information. While a CORESET configuration and a PDCCH SS configuration are shown in FIG. 5 as separately signaled, for convenience of description, the present disclosure is not limited thereto. For example, the CORESET configuration and the PDCCH SS configuration may be transmitted in one message (e.g., by one RRC signaling) or separately in different messages.

The PDCCH SS configuration may include information about the configuration of a PDCCH SS set. The PDCCH SS set may be defined as a set of PDCCH candidates monitored (e.g., blind-detected) by the UE. One or more SS sets may be configured for the UE. Each SS set may be a USS set or a CSS set. For convenience, PDCCH SS set may be referred to as "SS" or "PDCCH SS".

A PDCCH SS set includes PDCCH candidates. A PDCCH candidate is CCE(s) that the UE monitors to receive/detect a PDCCH. The monitoring includes blind decoding (BD) of PDCCH candidates. One PDCCH (candidate) includes 1, 2, 4, 8, or 16 CCEs according to an aggregation level (AL). One CCE includes 6 REGs. Each CORESET configuration is associated with one or more SSs, and each SS is associated with one CORESET configuration. One SS is defined based on one SS configuration, and the SS configuration may include the following information/fields.

searchSpaceId: indicates the ID of an SS.
controlResourceSetId: indicates a CORESET associated with the SS.
monitoringSlotPeriodicityAndOffset: indicates a periodicity (in slots) and offset (in slots) for PDCCH monitoring.
monitoringSymbolsWithinSlot: indicates the first OFDM symbol(s) for PDCCH monitoring in a slot configured with PDCCH monitoring. The first OFDM symbol(s) for PDCCH monitoring is indicated by a bitmap with each bit corresponding to an OFDM symbol in the slot. The MSB of the bitmap corresponds to the first OFDM symbol of the slot. OFDM symbol(s) corresponding to bit(s) set to 1 corresponds to the first symbol(s) of a CORESET in the slot.
nrofCandidates: indicates the number of PDCCH candidates (one of values 0, 1, 2, 3, 4, 5, 6, and 8) for each AL where AL={1, 2, 4, 8, 16}.
searchSpaceType: indicates common search space (CSS) or UE-specific search space (USS) as well as a DCI format used in the corresponding SS type.

Subsequently, the BS may generate a PDCCH and transmit the PDCCH to the UE (S506), and the UE may monitor PDCCH candidates in one or more SSs to receive/detect the PDCCH (S508). An occasion (e.g., time/frequency resources) in which the UE is to monitor PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

A CCE-to-REG mapping type is set to one of an interleaved type and a non-interleaved type.

Non-interleaved CCE-to-REG mapping (or localized CCE-to-REG mapping) (FIG. 5): 6 REGs for a given CCE are grouped into one REG bundle, and all of the REGs for the given CCE are contiguous. One REG bundle corresponds to one CCE.

Figure 6:
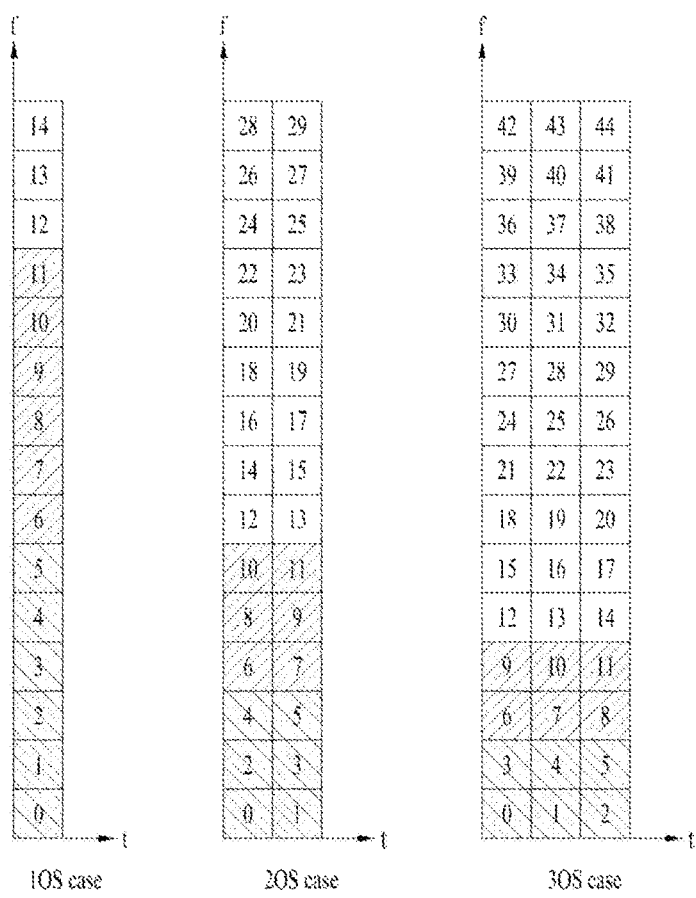
FIGS. 6 and 7 illustrate exemplary control resource set (CORESET) structures.
Figure 7:
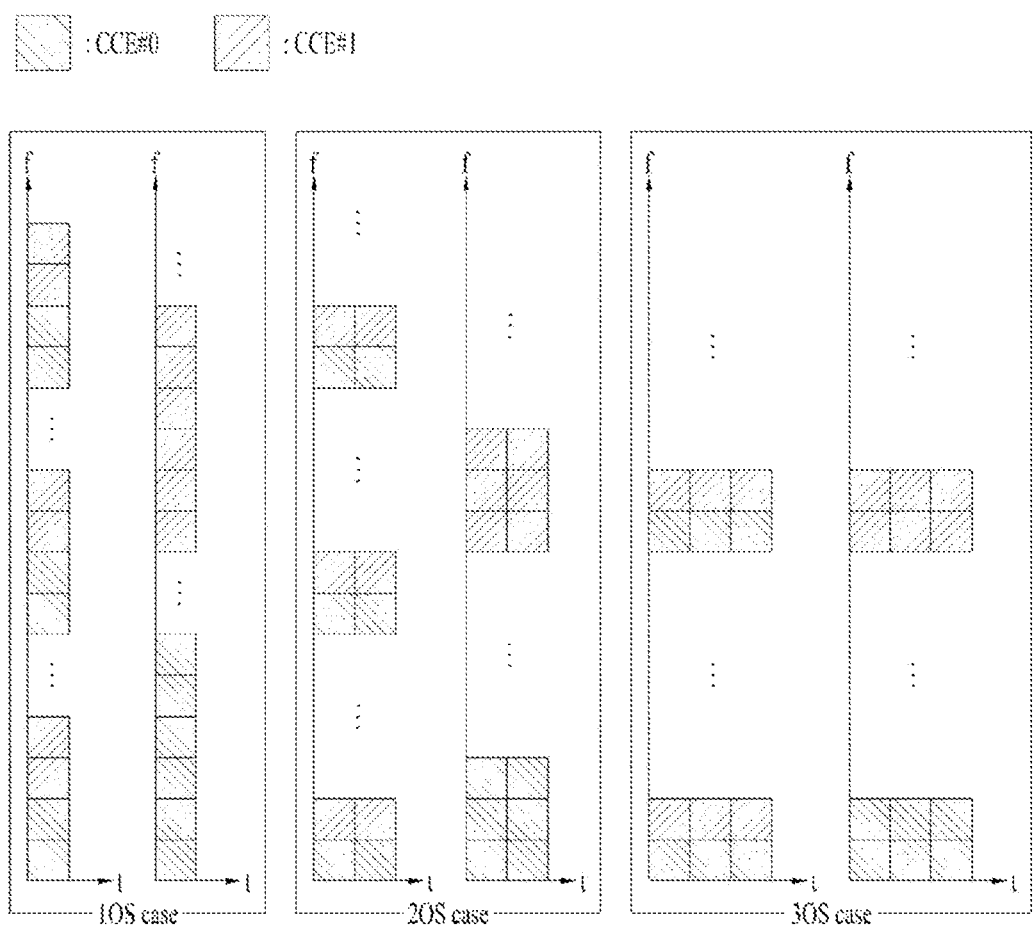

Interleaved CCE-to-REG mapping (or distributed CCE-to-REG mapping) (FIG. 6): 2, 3 or 6 REGs for a given CCE are grouped into one REG bundle, and the REG bundle is interleaved within a CORESET. In a CORESET including one or two OFDM symbols, an REG bundle includes 2 or 6 REGs, and in a CORESET including three OFDM symbols, an REG bundle includes 3 or 6 REGs. An REG bundle size is configured on a CORESET basis.

Beam Management (BM) Procedure

A DL BM procedure is described. DL BM procedure may include (1) transmission of beamformed DL RSs (e.g., CSI-RS or SS Block (SSB)) of the base station, and (2) beam reporting of the UE. Here, the beam reporting may include a preferred DL RS ID(s) and a corresponding reference signal received power (L1-RSRP). The DL RS ID may be an SSB Resource Indicator (SSBRI) or a CSI-RS Resource Indicator (CRI).

The SSB beam and the CSI-RS beam may be used for beam measurement. Here, measurement metric may be L1-RSRP per resource/block. SSB may be used for coarse beam measurement, and CSI-RS may be used for fine beam measurement. And, SSB can be used for both Tx beam sweeping and Rx beam sweeping. Rx beam sweeping using SSB may be performed at a UE by changing the Rx beam for the same SSBRI across multiple SSB bursts. Here, one SS burst includes one or more SSBs, and one SS burst set includes one or more SSB bursts.

The UE may receive RRC configuration regarding a list of maximum M candidate Transmission Configuration Indication (TCI) states for the purpose of at least Quasi Co-location (QCL) indication. Here, M may be 64. Each TCI state may be set to one RS set.

Each ID of DL RS for spatial QCL purpose (e.g., QCL Type D) in the RS set may be related to one of DL RS types such as SSB, P-CSI RS, SP-CSI RS, and A-CSI RS. At least, initialization/update of ID of DL RS(s) in RS set used for spatial QCL purpose can be performed through at least explicit signaling.

Table 5 shows an example of a TCI-State information element (IE). The TCI-State IE associates one or two DL RSs to a corresponding QCL type.

TABLE 5

```
-- ASN1START
-- TAG-TCI-STATE-START
TCI-State ::=            SEQUENCE {
    tci-StateId              TCI-StateId,
    qcl-Type 1               QCL-Info,
    qcl-Type2                QCL-Info          OPTIONAL, -- Need R
```

TABLE 5-continued

```
}
QCL-Info ::=              SEQUENCE {
   cell                   ServCellIndex          OPTIONAL, -- Need R
   bwp-Id                 BWP-Id                 OPTIONAL, -- Cond CSI
-RS-Indicated
   referenceSignal        CHOICE {
      csi-rs                 NZP-CSI-RS-ResourceId,
      ssb                    SSB-Index
   },
   qcl-Type               ENUMERATED {typeA, typeB, typeC, typeD},
   ...
}
-- TAG-TCI-STATE-STOP
-- ASN1STOP
```

In Table 5, the bwp-Id parameter indicates the DL BWP in which the RS is located, the cell parameter indicates the carrier in which the RS is located, and the reference signal parameter indicates reference antenna port(s) which is a quasi co-location source for target antenna port (s) or a reference signal including the reference antenna port(s). The target antenna port(s) may be an antenna port (s) of a CSI-RS, PDCCH DMRS, or PDSCH DMRS. For example, in order to indicate QCL reference RS information for NZP CSI-RS, a corresponding TCI state ID may be indicated through NZP CSI-RS resource configuration information. The TCI state ID may be indicated through each CORESET configuration, thereby QCL reference information for the PDCCH DMRS antenna port(s) is indicated. The TCI state ID may be indicated through DCI, thereby QCL reference information for the PDSCH DMRS antenna port(s) is indicated.

Antenna port-QCL is defined so that a property of channel carrying a symbol on the antenna port is can be inferred/estimated from a property of a channel carrying another symbol on the same antenna port.

QCL related channel property includes one or more of Delay spread, Doppler spread, Frequency shift, Average received power, Received Timing, and Spatial RX parameter. The Spatial Rx parameter means a spatial (reception) channel characteristic parameter such as angle of arrival.

The UE may be configured with a list of maximum M TCI-States through the higher layer parameter PDSCH-Config for PDSCH decoding according to a detected PDCCH having DCI intended for the UE and a given serving cell. The M depends on UE capability.

Each TCI-State includes parameters for configuring a quasi co-location relationship between one or two DL reference signals and a DM-RS port(s) of a PDSCH. The quasi co-location relationship is configured based on a higher layer parameter 'qcl-Type1' for the first DL RS and a higher layer parameter 'qcl-Type2' (if presented) for the second DL RS. In the case of a corresponding configuration including QCL information for two DL RSs, the QCL type is not the same regardless of whether the two DL RSs are QCLed with the same DL RS or different DL RSs. The quasi co-location type corresponding to each DL RS is given by the higher layer parameter 'qcl-Type of QCL-Info', and can be one of following types:
  'QCL-TypeA': {Doppler shift, Doppler spread, average delay, delay spread}
  'QCL-TypeB': {Doppler shift, Doppler spread}
  'QCL-TypeC': {Doppler shift, average delay}
  'QCL-TypeD': {Spatial Rx parameter}

For example, if a target antenna port(s) relates to a specific NZP CSI-RS, the corresponding NZP CSI-RS antenna ports are indicated/configured to be QCLed with a specific tracking reference signal (TRS) from a QCL-Type A perspective, and with a specific SSB from a QCL-Type D perspective. The UE receiving the indication/configuration can receive the corresponding NZP CSI-RS using the Doppler and delay values measured in QCL-TypeA TRS, and can apply a reception beam used for QCL-TypeD SSB reception to the corresponding NZP CSI-RS reception. The UE receives an activation command which is used for mapping a maximum 8 TCI states to values (field states) of 'Transmission Configuration Indication field' in DCI.

In the UL BM, beam reciprocity (or beam correspondence) between Tx beams and Rx beams may or may not be established according to UE implementation. If the reciprocity between the Tx beam and the Rx beam is established in both the base station and the UE, the UL beam pair may be aligned through the DL beam pair. However, when the reciprocity between the Tx beam and the Rx beam is not established in either of the base station and the UE, a UL beam pair determination process is required separately from the DL beam pair determination. Also, even when both the base station and the UE maintain beam correspondence, the base station may use the UL BM procedure for determining the DL Tx beam without the UE requesting a report of the preferred beam. UL BM may be performed through beamformed UL SRS transmission, and the 'SRS-SetUse' parameter can be set to 'BeamManagement'. Similarly, the UL BM procedure may be divided into Tx beam sweeping of the UE and Rx beam sweeping of the base station. The UE may receive one or more Sounding Reference Symbol (SRS) resource sets configured by (higher layer parameter) SRS-ResourceSet (through higher layer signaling, RRC signaling, etc.). For each SRS resource set, the UE K SRS resources (higher later parameter SRS-resource) may be configured. Here, K is a natural number that is equal to or greater than 1, and the maximum value of K is indicated by SRS capability. Whether to apply the UL BM of the SRS resource set (higher layer parameter) is configured by SRS-SetUse. When the SRS-SetUse is set to 'BeamManagement (BM)', only one SRS resource can be transmitted to each of a plurality of SRS resource sets at a given time instant.

Cooperative Transmission from Multiple TRPs/Panels/Beams

A coordinated multi-point transmission (CoMP) was introduced in the LTE system and partly introduced in NR Rel-15. The CoMP can be related to (i) a method of transmitting the same signal or the same information from multiple transmission and reception points (TRPs) (e.g., same layer joint transmission), (ii) a method of transmitting by a specific TRP at a specific moment in consideration of radio channel quality or traffic load conditions while sharing information to be transmitted to UE between a plurality of TRPs (e.g., point selection), or (iii) a method of transmitting different signals or information from a plurality of TRPs to different spatial layers by spatial dimension multiplexing (SDM) (e.g., independent layer joint transmission), or other various ways. As one example of the point selection methods, there is a dynamic point selection (DPS) method in which an actual transmitting TRP can be changed at each PDSCH transmission instance, and the QCL information informs the UE of which TRP is transmitting the PDSCH at present. In this regards, the QCL information can be used for indicating the UE can assume the same channel properties (e.g., Doppler shift, Doppler spread, average delay, delay spread, spatial RX parameter) between different antenna ports. For example, when the PDSCH is to be transmitted in TRP #1, it is informed that the corresponding PDSCH DMRS antenna ports and a specific RS (e.g., CSI-RS resource #1) that has been used in TRP #1 are QCLed. And when the PDSCH is to be transmitted in TRP #2, it is informed that the corresponding PDSCH DMRS antenna ports and a specific RS (e.g., CSI-RS resource #2) that has been used in TRP #1 are QCLed. For instantaneous QCL information indication, a PDSCH quasi-colocation information (PQI) field was defined in DCI of LTE, and similarly a transmission configuration information (TCI) field is defined in NR. The QCL indication/configuration method defined in the standard can be used not only for cooperative transmission between a plurality of TRPs, but also used for cooperative transmission between a plurality of panels (e.g., antenna groups) of the same TRP, or for cooperative transmission between a plurality of beams of the same TRP, etc. This is because if transmission panels or beams used in the same TRP are different, the Doppler, delay property, or reception beam (spatial Rx parameter) of each panel/beam may be different.

A method of Multiple TRPs/Panels/Beams are configured to transmit different layer groups to the UE may be used and the method can be called independent layer joint transmission (ILJT) or non-coherent joint transmission (NCJT).

Multimedia Broadcast/Multicast Service (MBMS)

MBMS scheme deployed in 3GPP LTE is described. 3GPP MBMS can classified as (i) a single frequency network (SFN) scheme in which cells of a plurality of base stations are synchronized for transmitting the same date through a PMCH channel, and (ii) a Single Cell Point To Multipoint (SC-PTM) scheme in which broadcasting is performed through PDCCH/PDSCH channel in a corresponding cell coverage. Normally, the SFN scheme is used for providing the broadcast service over wide area (e.g. MBMS area) through pre-allocated semi-static resource(s), whereas the SC-PTM scheme is used for providing the broadcast service within a cell coverage through a dynamic resource(s).

Terms of 3GPP LTE MBMS are Defined as Follows:

MBSFN Synchronization Area: an area of the network where all eNodeBs can be synchronized and perform MBSFN transmissions. MBSFN Synchronization Areas are capable of supporting one or more MBSFN Areas. On a given frequency layer, a eNodeB can only belong to one MBSFN Synchronization Area. MBSFN Synchronization Areas are independent from the definition of MBMS Service Areas MBSFN Transmission or a transmission in MBSFN mode: a simulcast transmission technique realized by transmission of identical waveforms at the same time from multiple cells. An MBSFN Transmission from multiple cells within the MBSFN Area is seen as a single transmission by a UE.

MBSFN Area: an MBSFN Area consists of a group of cells within an MBSFN Synchronization Area of a network, which are coordinated to achieve an MBSFN Transmission. Except for the MBSFN Area Reserved Cells, all cells within an MBSFN Area contribute to the MBSFN Transmission and advertise its availability. The UE may only need to consider a subset of the MBSFN areas that are configured, i.e. when it knows which MBSFN area applies for the service(s) it is interested to receive.

SC-PTM provides one logical channel named as SC-MCCH (Single Cell Multicast Control Channel), and one or more logical channels named as SC-MTCH (Single Cell Multicast Traffic Channel). The logical channels are mapped to a transport channel 'DL-SCH', and a physical channel 'PDSCH'. PDSCH carrying SC-MCCH or SC-MTCH data is scheduled by PDCCH scrambled with G-RNTI. Here, TMGI that corresponds to a service ID can be mapped to a specific G-RNTI value (e.g., one-to-one mapping). Thus, if base station provides a plurality of services a plurality of G-RNTI values can be allocated for SC-PTM transmission. One or more UEs may monitor PDCCH by using a specific G-RNTI for receiving a specific service. For specific service/specific G-RNTI, an SC-PTM dedicated DRX on-duration can be configured. In this case, the UEs may wake-up for a specific on-duration (s) and perform PDCCH monitoring based on G-RNTI.

G-RNTI Based DCI on a CORSET for Broadcast/Multicast Data Scheduling

At least part of above paragraphs (e.g., 3GPP system, frame structure, NR system, etc.) can be referred to/coupled to/combined with one or more embodiments of the invention will be explained below. In the specification, '/' may interpreted as 'and', 'or', or 'and/or' based on its context.

For supporting MBMS service in NR system, DL broadcast or DL multicast transmission methods are discussed under Rel.-17 NR standard. Comparing with DL unicast transmission to individual UE (i.e., point-to-point), the point-to-multipoint (PTM) transmission scheme such as MBMS is advantageous for radio resource saving since multiple UEs can receive one-time DL broadcast/multicast transmission of network.

In order to maximize the gain of PTM transmission, both RRC idle/inactive UEs and RRC connected UEs should be able to receive the same DL broadcast/multicast transmission.

In LTE, Single Frequency Network (SFN) transmission from a plurality of cells has been introduced. In the LTE system, even if a UE is located at the cell edge, it is possible to simultaneously receive transmissions from a plurality of cells, thereby reliable DL broadcast/multicast transmission is possible.

On the other hand, in NR, SFN-based transmission scheme is not considered, and only DL broadcast/multicast transmission scheme in a single cell is considered. Thus, a reliable DL broadcast/multicast transmission scheme for a cell edge-UE is required for NR.

An embodiment of the present invention proposes a broadcast and multicast transmission scheme using a multi-PDCCH based ILJT, for a case in which a base station provides a plurality of transmission and reception points (TRPs) and beamforming.

In an embodiment of the present invention:
gNB can configure multiple CORSETs and multiple search space sets for group scheduling for broadcast/multicast transmissions via system information or MCCH signaling or UE-dedicated signaling. Each CORSET/SS set may correspond to a single TRP.
  a. The CORESTs and the search space sets may be configured in a particular bandwidth part of a particular cell for one or more particular RNTIs (e.g. G-RNTIs) or one or more particular broadcast/multicast service IDs (e.g. one or more TMGIs).
gNB can transmit multiple DCIs to schedule multiple transmissions of a Transport Block (TB) from multiple TRPs with different beams in TDM/FDM/CDM/SDM. Each of the DCIs may indicate one or more TCI states.
  a. Each TCI state can be associated to a single beam/TRP.
gNB can receive a HARQ feedback on UCI based on one of the TCI states.

In addition, an embodiment of the present invention proposes a broadcast and multicast reception scheme using multi-PDCCH based ILJT when (analogue) beamforming is applied to the UE (in mmWave band).
UE can configure one or more CORSET/SS sets for broadcast/multicast transmissions associated to the G-RNTI according to the received MBMS control information.
  a. If the MBMS control information indicates one or more CORSET IDs and one or more Search Space IDs, the UE may acquire detailed configuration of the CORSET/SS sets mapped to the IDs from system information or UE-dedicated signalling.
  b. The CORSETs and/or the search space sets may correspond to different TCI states (or different TRP/beams).
UE can measure a set of SS/PBCH blocks and/or a set of CSI-RS resources associated to MBMS according to the MBMS control information.
UE can select one or more SS/PBCH blocks or one or more CSI-RS resources of which quality is higher than a threshold. Each of the selected SS/PBCH blocks or the selected CSI-RS resources can be associated to a TCI state.
  a. The threshold may be a RSRP/RSRQ/SINR threshold configured by a specification or network configuration.
UE may determine monitoring occasions for PDCCH candidates of one or more CORSET/SS sets associated to one or more TCI states associated with the selected SS/PBCH block(s) or the selected CSI-RS resource(s).
  a. Each CORSET/SS may correspond to one or more TCI states.
UE receives one or more DCIs scheduling a same TB. The TB maybe transmitted by one or more PDSCH transmissions
  a. Each of the PDSCH transmissions maybe associated to one or more DCIs.
  b. One or more PDSCH transmissions maybe associated to a single DCI indicating one or more TCI states.
  c. The CRCs of the DCIs can be scrambled by the same G-RNTI value.
UE receives one or more PDSCH transmissions indicated by the DCI(s) based on the associated TCI state(s).
  a. The PDSCH transmissions may carry the same TB.
  b. The UE can combine the PDSCH transmissions carrying the same TB in a soft buffer to decode the TB.

In an embodiment of the present invention, a base station can provide a plurality of TRPs and a plurality of beams for reliable DL broadcast/multicast transmission. Different TRPs/Beams may provide different SSB resources or different CSI-RS resources.

Transmission Side (e.g., Base Station)

In a state in which a cell broadcasts a MBMS service, a base station may transmit SIB1, MBMS SIB, one or more MCCHs, and/or one or more MTCHs. Each of logical channels MCCH and MTCH may be transmitted through a physical channel, PDSCH, and may be scheduled through a PDCCH. The MCCH may carry MBMS control information, and the MTCH may carry specific MBMS service data.

Figure 8:
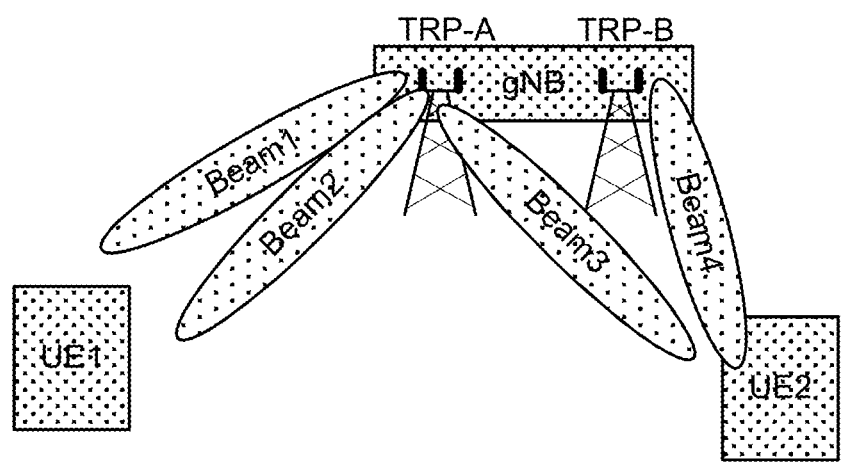
FIG. 8 illustrates broadcast or multicast of the same data based on multiple TRPs/beams according to an embodiment of the present invention.

FIG. 8 illustrates a plurality of UEs receiving the same MBMS TB.

Each UE may inform the base station of a service ID or G-RNTI of the MBMS TB. If the base station knows the optimal/best/preferred TCI state 1 and TCI state2 for UE1 and the optimal/best/preferred TCI state 2 for UE2, the base station can transmit DCI1 through a CORSET/SS set for TCI state 1, DCI2 may be transmitted through a CORSET SS set for TCI state 2. Also, DCI1 and DCI2 may indicate/schedule different PDSCH data transmissions.

Figure 9A:
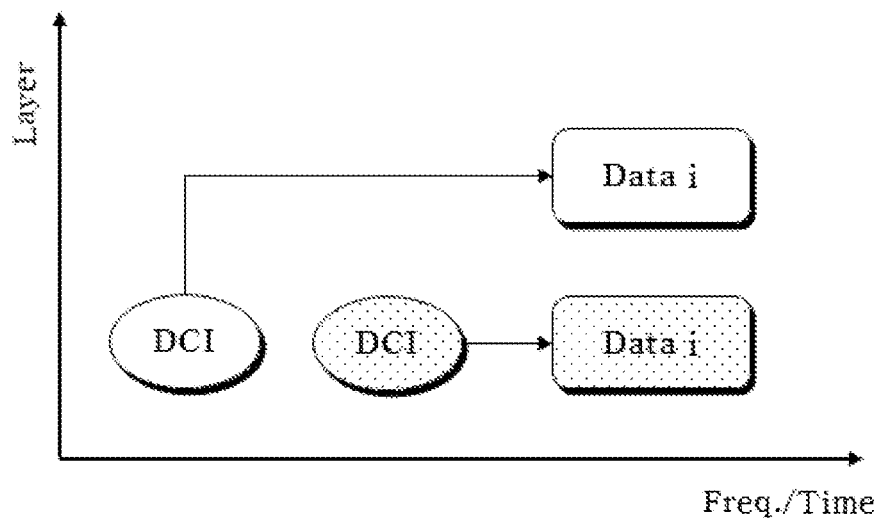
FIGS. 9A and 9B illustrates a TB transmissions based on overlapping/non-overlapping PDSCHs according to embodiments of present invention.
Figure 9B:
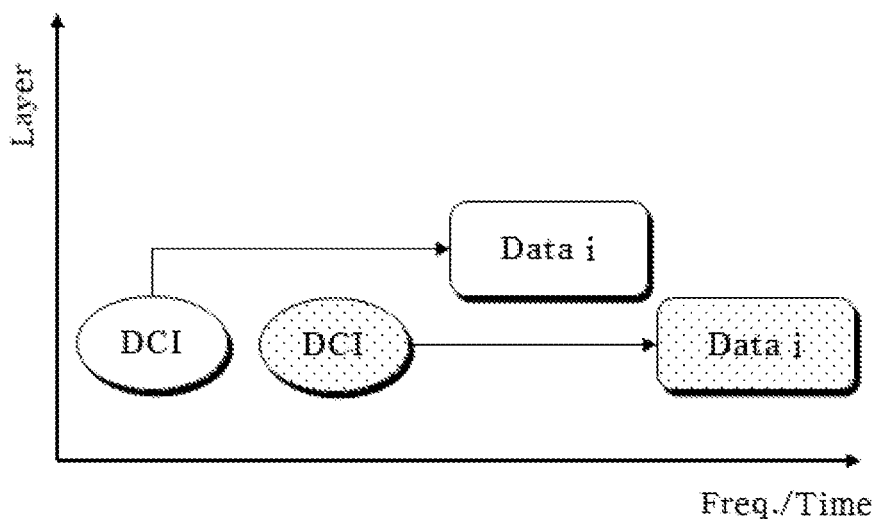

In FIGS. 9A and 9B, the base station may indicate/schedule different PDSCHs through different DCI 1 and DCI 2. Different PDSCHs may transmit the same TB. As shown in FIG. 9A, different PDSCHs may be transmitted through different PDSCH layer groups on the same frequency/time resource. Or, as shown in FIG. 9B, different PDSCHs may be transmitted through different frequency/time resources.

The different DCI 1 and DCI 2 may be provided through different SS sets for multicast/broadcast (e.g., MSS sets), and may be transmitted/received in the same symbol period or in different symbol periods. Different SS sets may be mapped/associated with one SS set group. One SS set group may be mapped/associated with one or more multicast/broadcast services or one or more G-RNTIs.

Reception Side (e.g., UE)

In RRC Connected mode, UE can perform a BM procedure. Accordingly, the base station and the UE may determine/manage the optimal/best/preferred beam for the corresponding UE. At this time, according to the MBMS transmission scheme of the base station, the TCI state selected through the BM procedure of the UE may be applied to not only unicast PDSCH reception but also broadcast/multicast PDSCH (i.e., MBMS PDSCH) reception. In this case, the base station indicates to the UE or MBMS UEs in a cell through system information, MCCH channel, or UE-dedicated signal that the optimal/best/preferred TCI state selected in the current BM process can be used for MBMS TB reception. Alternatively, the base station may indicate, through DCI of the PDCCH scheduling a PDSCH for transmitting a MBMS TB, that the optimal/best/preferred TCI state selected in the BM procedure of the connected UE can be used for the MBMS PDSCH reception. If multiple connected UEs receive the same MBMS TB, the base station can broadcast the MBMS TB through one or more optimal/best/preferred beams because the base station knows the optimal/best/preferred beam of each UE.

However, depending on the MBMS transmission scheme of the base station, a UE may need to receive a separate SSB or CSI-RS. For example, the UE may receive, through system information or an MCCH channel or UE-dedicated signal, MBMS control information, and then receive an SSB Resource Set List including SSB resources used for MBMS from the base station. Here, the SSB resource set is {SSBx1, SSBx2, SSBx3, SSBx4, . . . } can be set. The SSB index may be defined from 0 to 63. The SSB Resource Set List or a specific SSB resource set can be configured to associate with one or more G-RNTIs or one or more BWPs for MBMS, one or more MBMS cells, one or more MCCHs, one or more MTCHs, and/or one or more MBMS services IDs (e.g., one or more TMGIs).

Alternatively, a UE may receive MBMS control information through system information or MCCH channel or UE-dedicated signal, and then receive a CSI-RS Resource Set List including CSI-RS resources used for MBMS from the base station. The other CSI-RS resource set(s) is identified by the CSI-RS resource set ID(s), and one resource set may include at least one CSI-RS resource. Each CSI-RS resource may be identified by a CSI-RS resource ID. The CSI-RS Resource Set List or a specific CSI-RS Resource Set ID can be configured to associate with one or more G-RNTIs, one or more BWPs for MBMS, one or more MBMS cells, one or more MCCHs, one or more MTCHs, or one or more MBMS Service IDs (eg one or more TMGIs).

In the SSB/CSI-RS configuration information, there may be a signaling overhead problem. To solve the problem, when MBMS control information is provided through system information or MCCH channel or UE-dedicated signal, a base station may include ID(s) of a SSB resource set(s) or a CSI-RS resource set (s) but the detailed configuration may not be included in the MBMS control information.

For example, when the MBMS control information received by the UE includes only SSB index(es) or CSI-RS resource set ID(s), the UE may obtain detailed configuration for a corresponding index/ID(s) can be obtained from a detailed SSB resource configuration list or a detailed CSI-RS resource configuration list received through SIB1, Other SI or UE dedicated signaling. The detailed SSB resource configuration list or detailed CSI-RS resource configuration list may be configuration information for a serving cell, configuration information for an MBMS dedicated reference signal, or configuration information for a configured BWP or active BWP.

Meanwhile, the base station may provide a UE with a threshold through the MBMS control information or the configuration information so that the UE can select a Beam/TRP/TCI state. The threshold may be an RSRP/RSRQ/SINR threshold, and the base station indicates to the UE, or may be determined according to a predefined rule (e.g. highest RSRP/SINR) without a separate indication/configuration by the base station. If the base station indicates the threshold, or if the rule (e.g., highest RSRP/SINR) is predefined instead of a separate indication/configuration by the base station, the UE can select N CORESETs with different TCIs from among M CORESETs with different TCIs from (e.g., M=32, N=an integer value from 1 to 4). The value 'N' may be configured differently according to UE capability.

For example, UE1 of FIG. 8 assumes that both Beam 1 and Beam 2 of TRP-A are above the threshold. And, UE1 selects TCI state 1 and TCI state 2 corresponding to Beam 1 and Beam 2. Based on the two selected TCI states, UE1 may receive two DCIs (e.g., as shown in FIG. 9A or FIG. 9B). In this case, one DCI may correspond to TCI state 1, and another DCI may correspond to TCI state 2.

Alternatively, UE1 receives only one DCI according to the highest RSRP/RSRQ/SINR, and when the received DCI indicates two TCI states, then the UE1 may receive two PDSCH data transmissions of FIG. 9A or FIG. 9B. That is, the code point of the DCI may simultaneously indicate the TCI state 1 and the TCI state 2, and the UE may receive the PDSCH transmission indicated by the DCI using one or more TCI states indicated by the DCI. For example, only one PDSCH transmission may be received according to the highest RSRP/RSRQ/SINR, or both PDSCH transmissions may be received according to a threshold. The base station can configure both DCIs to indicate both TCI state 1 and TCI state 2 at the same time.

On the other hand, UE2 of FIG. 8 assumes that both beam 3 of TRP-A and beam 4 of TRP-B are above the threshold. In this case, UE2 may select TCI state 3 and TCI state 4 corresponding to Beam 3 and Beam 4. Based on the two selected TCI states, UE2 can receive each of the two DCIs in FIG. 9A or FIG. 9B. In this case, one DCI may correspond to TCI state 3, and another DCI may correspond to TCI state 4.

Alternatively, UE2 may receive only one DCI according to the highest RSRP/RSRQ/SINR, and when the received DCI indicates two TCI states, the UE2 can receive two PDSCH data transmissions of FIG. 9A or FIG. 9B. The code point of DCI may simultaneously indicate TCI state 3 and TCI state 4, and the UE may receive the PDSCH transmission indicated by the DCI using one or more TCI states indicated by the DCI. For example, only one PDSCH transmission may be received according to the highest RSRP/RSRQ/SINR, or both PDSCH transmissions may be received according to the threshold. The base station can configure both DCIs to indicate both TCI state 3 and TCI state 4 at the same time.

Meanwhile, a base station providing the MBMS may transmit, in a corresponding cell, at least part of following information/contents:

Information included in SIB
  a. Information indicating whether the base station is broadcasting a MBMS SIB
  b. Information indicating a UE to use a TypeOA-PDCCH CSS set to receive the MBMS SIB, or configuration for a new CORSET and a new PDCCH CSS Set Type for receiving MBMS SIB.
  c. If the MBMS SIB and MCCH/MTCH are transmitted through a DL BWP different from the Initial DL BWP, configuration for the DL BWP for the MBMS is provided.
  d. SC-RNTI value for one or more MCCH is provided. The SC-RNTI value may be differently provided/configured for each MCCH.
  e. Information indicating whether the MBMS SIB is currently being broadcast. And if not broadcast, information regarding RACH preamble and/or RACH resource can be provided for requesting on-demand based transmission of the MBMS SIB.

Information can be included (e.g., newly added) in MBMS SIB
  a. MBMS DL BWP configuration information
    i. Information regarding a frequency location, a bandwidth size, and SCS of the DL BWP in which the PDCCH/PDSCH for MCCH/MTCH.
    ii. For MBMS service reception, UE receives the MBMS DL BWP configuration information and activates the MBMS DL BWP. The may UE deactivate the Initial DL BWP, may receive/monitor the Initial DL BWP simultaneously with the MBMS DL BWP, or may receive the Initial DL BWP at a different time from the MBMS DL BWP. In this case, the MBMS DL BWP for MCCH data transmission/reception is the MCCH DL BWP, and may be the same as or different from the MTCH DL BWP for MTCH data transmission/reception.
  b. PDCCH CSS set configuration information for MCCH data transmission
    i. The MCCH carries MBMS control information, and the UE may receive DCI scheduling MBMS control information of the MCCH through a new PDCCH CSS set type. To this end, the UE receives the PDCCH CSS set configuration information through the MBMS SIB and receives DCI for scheduling MCCH data by monitoring the corresponding PDCCH CSS set. The CRC of DCI is scrambled with SC-RNTI.
    ii. For transmitting the MBMS control information of the MCCH, the base station provides the UE with a plurality of CORSETs/CSS sets for a plurality of Beams/TRPs/TCI states. For receiving the MBMS control information of the MCCH, the UE selects the best SSB index according to the measurement of the SS/PBCH blocks of the serving cell, selects a TCI state for the best SSB index, and monitors the CORSET/CSS mapped to the selected TCI state.
    iii. The UE monitors a PDCCH through the CSS mapped to the selected TCI state, and receives DCI with CRC is scrambled with the SC-RNTI. The UE receives MBMS control information of the MCCH by receiving a PDSCH indicated by the DCI.
    iv. The CSS for transmitting MBMS control information of MCCH may be replaced with MBMS dedicated Search Space (MSS) or USS.
Information can be included (e.g., newly added) in MBMS control information of MCCH
  a. One or more DL BWP configuration information
    i. Here, the DL BWP can be the Initial DL BWP, the MBMS DL BWP or an active BWP of the UE. The MBMS DL BWP for MTCH is the MTCH DL BWP, and may be the same as or different from the MCCH DL BWP for MCCH.
  b. MBMS service ID list per DL BWP (e.g., TMGI List)
    i. The base station informs, through a specific DL BWP, the UE of a MBMS service ID(s) (e.g., IDs of MBMS services provided by the base station). The MBMS service ID is mapped to a specific MTCH, and the corresponding MBMS service data is transmitted through the PDSCH.
    ii. The UE activates a DL BWP providing a MBMS service the UE trying to receive. And the UE receives the MBMS service data through the corresponding DL BWP.
  c. G-RNTI mapped to/associated with MBMS service ID.
  d. For each MBMS service ID, information indicating whether HARQ feedback procedure for PDSCH is activated (enabled).
  e. For each MBMS service ID, PUCCH resource configuration information is provided for HARQ feedback procedure or CSI transmission for MBMS.
  f. For each MBMS service ID, MBMS UL BWP configuration information for HARQ feedback or CSI transmission for MBMS is provided.
    i. When the HARQ feedback procedure for the corresponding MBMS service is activated/enabled, the UE desiring to receive specific MBMS service data activates a MBMS UL BWP mapped to the corresponding MBMS service, and may transmit HARQ feedback through the MBMS UL BWP.
  f. Search Space Set configuration information mapped to/associated with MBMS service ID
    i. One or more MBMS service IDs are mapped to/associated with a specific MBMS Search Space Set (MSS set). In an embodiment of the present invention, MSS is defined as a new type of CSS, a new type of USS or a new search space that is different from CSS/USS.
    ii. The UE activates the DL BWP through which the MBMS service to be received, and monitors a PDCCH through a specific MSS set mapped to/associated with the MBMS service.
    iii. For a specific MSS set for transmitting specific MBMS service data, the base station provides the UE with a plurality of CORSETs/MSS sets for a plurality of Beams/TRPs/TCI states. For receiving specific MBMS service data, the UE selects the best SSB index according to the measurement of SS/PBCH blocks of the serving cell, selects a TCI state for the best SSB index, and monitors CORSET/MSS mapped to/associated with the selected TCI state.
    iv. The UE monitors the PDCCH through the MSS mapped to/associated with the selected TCI state, and receives DCI with CRC is scrambled with G-RNTI that is mapped/associated with to the MBMS service. The UE receives the MBMS service data by receiving a PDSCH indicated by the corresponding DCI.
    v. DCI related to the G-RNTI may indicate HARQ feedback through PUCCH or PUSCH. When the DCI indicates HARQ feedback and if HARQ feedback for the corresponding MBMS service is activated/enabled, the UE activates a MBMS UL BWP mapped to/associated with the corresponding MBMS service, and may transmit HARQ-ACK information through the MBMS UL BWP.

In an embodiment of the present invention, a plurality of DCIs and a plurality of PDSCH transmissions for the same TB are provided to support reliable DL broadcast/multicast transmission in a single cell. Also, reliable DL broadcast/multicast transmission can be achieved by allowing a UE to selectively receive one or more DCIs/PDSCHs according to one or more TCI states selected by the UE.

Figure 10:
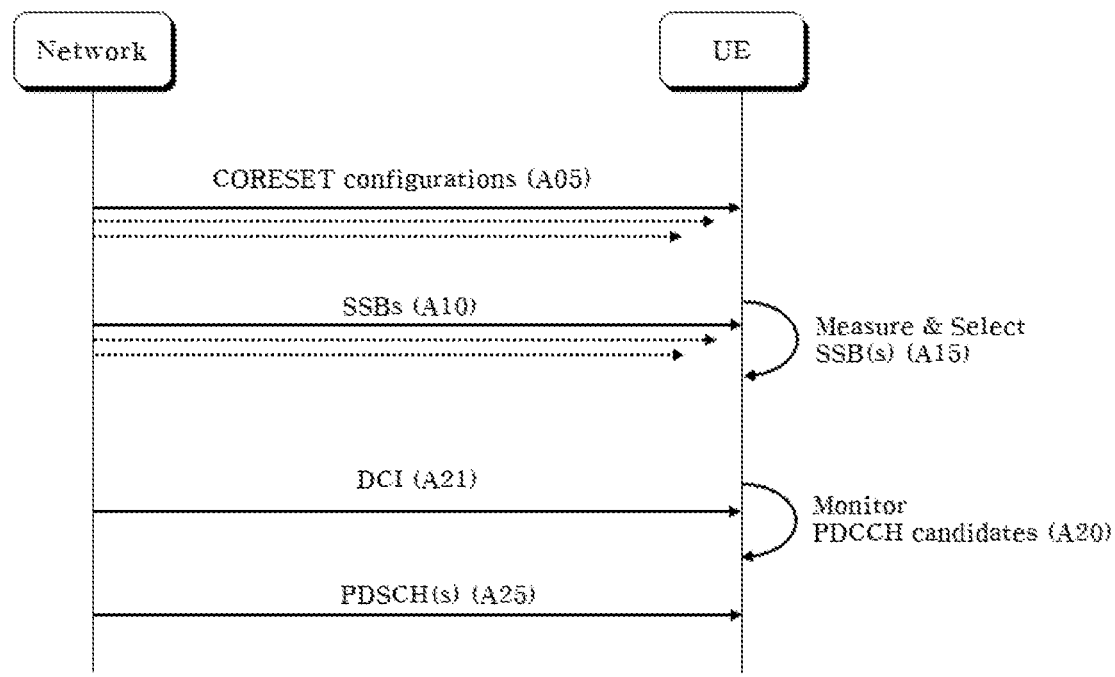
FIG. 10 illustrates a method of receiving a signal by a user equipment in an embodiment of the present invention.

FIG. 10 illustrates a method of receiving a signal by a user equipment in an embodiment of the present invention;

Referring to FIG. 10, the UE may receive configuration information for a plurality of control resource sets (CORESETs) associated with different synchronization signal blocks (SSBs), respectively (A05)

The UE may select at least one of the plurality of CORESETs based on a SSB measurement (A15)

The UE may receive DCI by monitoring physical downlink control channel (PDCCH) candidates on the selected at least one CORESET (A20, A21). A cyclic redundancy check (CRC) of the DCI can be scrambled with a group-radio network temporary identifier (G-RNTI) which has been selected by the UE in accordance with an identifier of a specific service to receive. And at least two or more of the plurality of CORSETs can be commonly associated with the same G-RNTI selected by the UE, for the specific service.

The DCI with the CRC scrambled with the G-RNTI, may be configured to indicate a plurality of transmission configuration index (TCI) states at once.

The UE may select one of the plurality of TCI states based on based on the DCI indicating the plurality of TCI states, and receive a corresponding physical downlink shared channel (PDSCH) based on the selected TCI state.

The UE may select at least one SSB based on a threshold related to the SSB measurement. The at least one CORESET may be associated with the at least one SSB selected by the UE. The threshold may be a configurable parameter indicated by a base station, or a value predefined in the wireless communication system.

The UE may select a best SSB for the UE from among the different SSBs. The at least one CORESET selected by the UE may be associated with the best SSB.

The BS (s) may receive, from the UE, information regarding at least one SSB selected by the UE based on a threshold.

The BSs may receive, from the UE, information regarding a best SSB for the UE from among the different SSBs.

Figure 11:
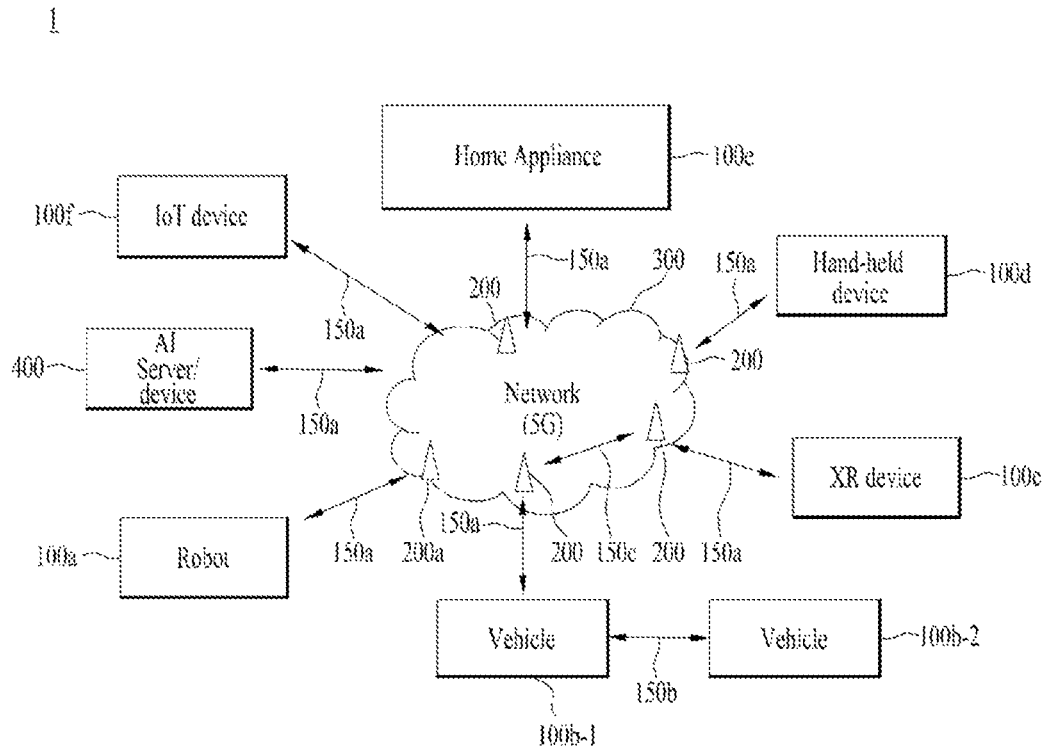
FIGS. 11 to 14 illustrate a communication system 1 and wireless devices applied to the present disclosure.

FIG. 11 illustrates a communication system 1 applied to the present disclosure.

Referring to FIG. 11, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 12:
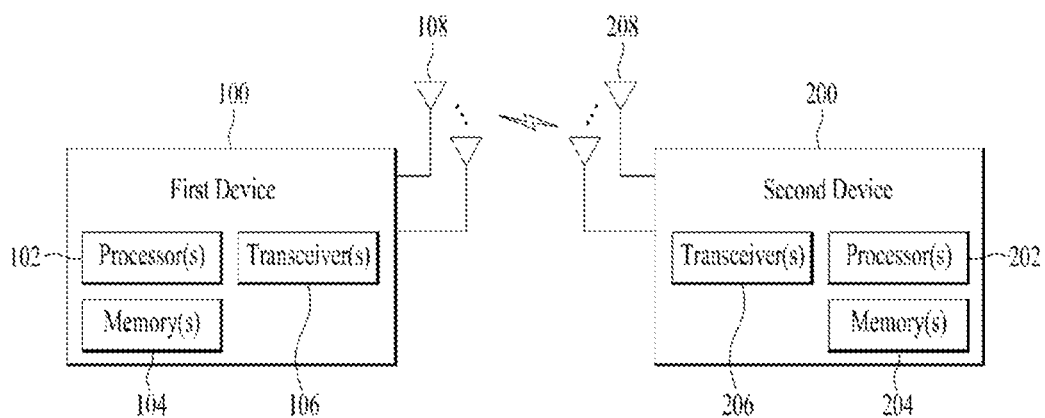

FIG. 12 illustrates wireless devices applicable to the present disclosure.

Referring to FIG. 12, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 11.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 13:
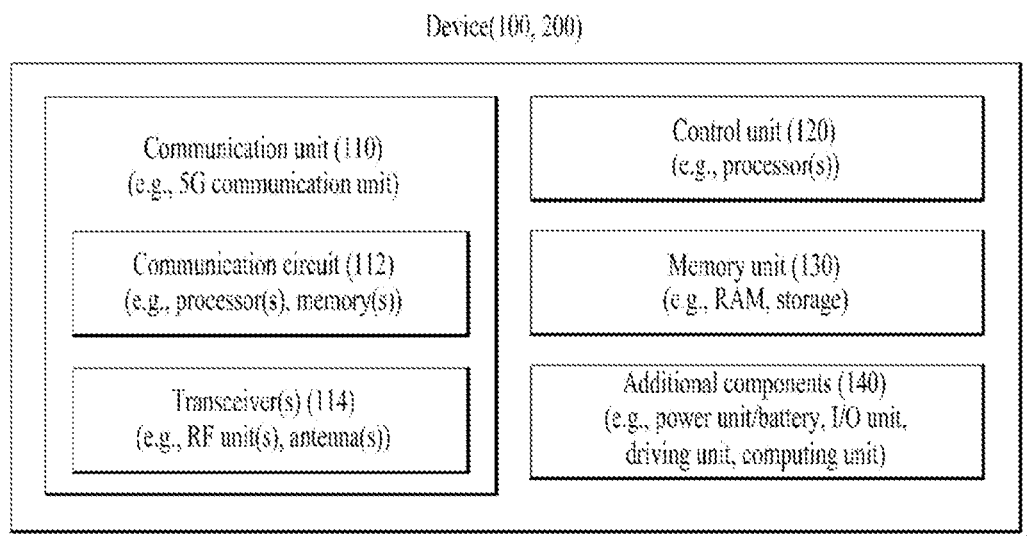

FIG. 13 illustrates another example of a wireless device applied to the present disclosure. The wireless device may be implemented in various forms according to a use-case/service (refer to FIG. 13).

Referring to FIG. 13, wireless devices 100 and 200 may correspond to the wireless devices 100 and 200 of FIG. 12 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 12. For example, the transceiver(s) 114 may include the one or more transceivers 106 and 206 and/or the one or more antennas 108 and 208 of FIG. 12. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 11), the vehicles (100b-1 and 100b-2 of FIG. 11), the XR device (100c of FIG. 11), the hand-held device (100d of FIG. 11), the home appliance (100e of FIG. 11), the IoT device (100f of FIG. 11), a digital broadcast terminal, a hologram device, a public safety device, an MTC device, a medicine device, a fintech device (or a finance device), a security device, a climate/environment device, the AI server/device (400 of FIG. 11), the BSs (200 of FIG. 11), a network node, etc. The wireless device may be used in a mobile or fixed place according to a use-example/service.

In FIG. 13, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 14:
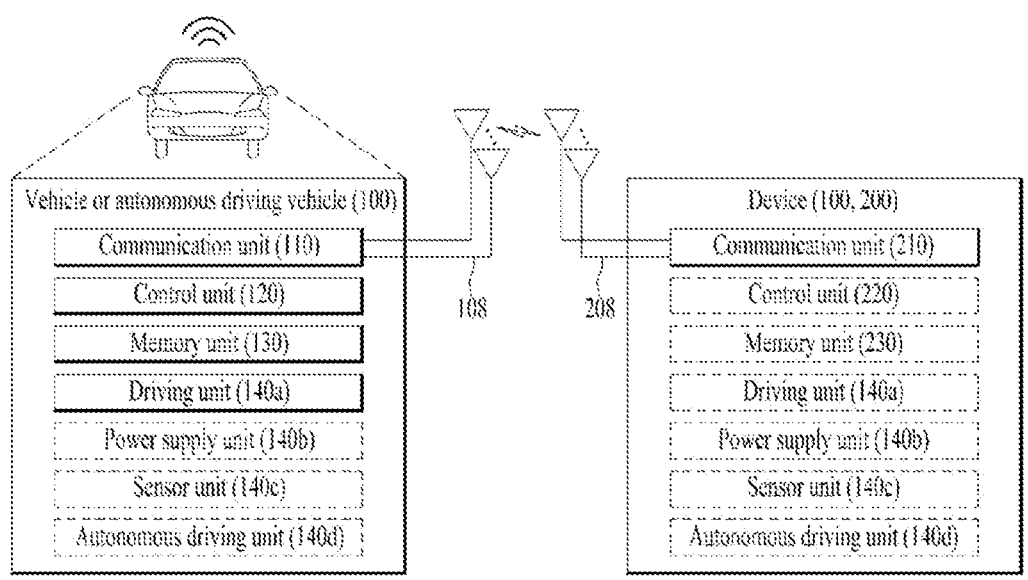

FIG. 14 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 14, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 13, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 15:
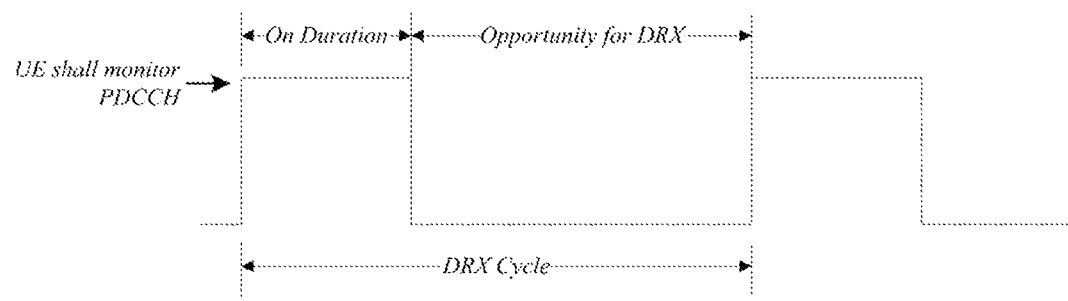
FIG. 15 illustrates an exemplary discontinuous reception (DRX) operation applied to the present disclosure.

FIG. 15 is a diagram illustrating a DRX operation of a UE according to an embodiment of the present disclosure.

The UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

Referring to FIG. 15, a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in the present disclosure. Irrespective of whether DRX is configured, PDCCH monitoring may be restricted during a time period configured as a measurement gap.

Table 7 describes a DRX operation of a UE (in the RRC_CONNECTED state). Referring to Table 7, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods, as illustrated in FIG. 5.

TABLE 7

| | Type of signals | UE procedure |
| --- | --- | --- |
| 1$^{st}$ Step | RRC signalling(MAC-CellGroupConfig) | Receive DRX configuration information |
| 2$^{nd}$ Step | MAC CE((Long) DRX command MAC CE) | Receive DRX command |
| 3$^{rd}$ Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the duration of the starting period of the DRX cycle.

Value of drx-InactivityTimer: defines the duration of a time period during which the UE is awake after a PDCCH occasion in which a PDCCH indicating initial UL or DL data has been detected Value of drx-HARQ-RTT-TimerDL: defines the duration of a maximum time period until a DL retransmission is received after reception of a DL initial transmission.

Value of drx-HARQ-RTT-TimerDL: defines the duration of a maximum time period until a grant for a UL retransmission is received after reception of a grant for a UL initial transmission.

drx-LongCycleStartOffset: defines the duration and starting time of a DRX cycle.

drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

For example, specifically, the UE may receive the afore-described CORESET configuration and SS (set) configuration and configure a CORESET and an SS in a CC/BWP based on the CORESET configuration and the SS (set) configuration. Further, the UE may attempt to detect a PDCCH by monitoring PDCCH candidates during the On Duration of a DRX cycle. When the BS generates/maps/transmits a PDCCH for/to the UE, the BS may transmit the PDCCH during the On Duration so that the UE may detect the PDCCH.

What is claimed is:

1. A method of receiving a signal by a user equipment (UE) in a wireless communication system, the method comprising:
    receiving configuration information for a plurality of control resource sets (CORESETs) associated with different synchronization signal blocks (SSBs), respectively;
    selecting at least one SSB based on a threshold related to a SSB measurement;
    selecting at least one of the plurality of CORESETs which is associated with the at least one SSB selected by the UE based on the threshold related to the SSB measurement; and
    receiving downlink control information (DCI) by monitoring physical downlink control channel (PDCCH) candidates on the selected at least one CORESET,
    wherein a cyclic redundancy check (CRC) of the DCI is scrambled with a group-radio network temporary identifier (G-RNTI) which has been selected by the UE in accordance with an identifier of a specific service to receive, and
    wherein at least two or more of the plurality of CORSETs are commonly associated with the same G-RNTI selected by the UE, for the specific service.

2. The method according to claim 1, wherein the DCI with the CRC scrambled with the G-RNTI is configured to indicate a plurality of transmission configuration index (TCI) states at once.

3. The method according to claim 2, further comprising:
    selecting one of the plurality of TCI states based on the DCI indicating the plurality of TCI states; and
    receiving a corresponding physical downlink shared channel (PDSCH) based on the selected TCI state.

4. The method according to claim 1, wherein the threshold is a configurable parameter indicated by a base station, or a value predefined in the wireless communication system.

5. The method according to claim 1, further comprising:
selecting a best SSB for the UE from among the different SSBs,
wherein the at least one CORESET selected by the UE is associated with the best SSB.

6. A non-transitory computer readable medium recorded thereon program codes for performing the method according to claim 1.

7. A user equipment (UE) for wireless communication, the UE comprising:
a transceiver; and
a processor configured to receive, via the transceiver, configuration information for a plurality of control resource sets (CORESETs) associated with different synchronization signal blocks (SSBs), respectively, to select at least one SSB based on a threshold related to a SSB measurement, to select at least one of the plurality of CORESETs which is associated with the at least one SSB selected based on the threshold related to the SSB measurement, and to receive downlink control information (DCI), via the transceiver, by monitoring physical downlink control channel (PDCCH) candidates on the selected at least one CORESET,
wherein a cyclic redundancy check (CRC) of the DCI is scrambled with a group-radio network temporary identifier (G-RNTI) which has been selected by the UE in accordance with an identifier of a specific service to receive, and
wherein at least two or more of the plurality of CORSETs are commonly associated with the same G-RNTI selected by the processor, for the specific service.

8. A device configured to control a user equipment (UE) for wireless communication, the device comprising:
a memory configured to store instructions; and
a processor configured to perform operations by executing the instructions, the operations comprising:
receiving configuration information for a plurality of control resource sets (CORESETs) associated with different synchronization signal blocks (SSBs), respectively;
selecting at least one SSB based on a threshold related to a SSB measurement selecting at least one of the plurality of CORESETs which is associated with the at least one SSB selected based on the threshold related to the SSB measurement; and
receiving downlink control information (DCI) by monitoring physical downlink control channel (PDCCH) candidates on the selected at least one CORESET,
wherein a cyclic redundancy check (CRC) of the DCI is scrambled with a group-radio network temporary identifier (G-RNTI) which has been selected by the UE in accordance with an identifier of a specific service to receive, and
wherein at least two or more of the plurality of CORSETs are commonly associated with the same G-RNTI selected by the UE, for the specific service.

9. A method of transmitting a signal by a base station in a wireless communication system, the method comprising:
transmitting, to a user equipment (UE), configuration information for a plurality of control resource sets (CORESETs) associated with different synchronization signal blocks (SSBs), respectively;
receiving, from the UE, information regarding at least one SSB selected by the UE based on a threshold; and
transmitting, to the UE, downlink control information (DCI) based on physical downlink control channel (PDCCH) candidates on at least one of the plurality of CORESETs, the at least one CORESET being associated with the at least one SSB selected by the UE,
wherein a cyclic redundancy check (CRC) of the DCI is scrambled with a group-radio network temporary identifier (G-RNTI) in accordance with an identifier of a specific service to transmit, and
wherein at least two or more of the plurality of CORSETs are commonly associated with the same G-RNTI, for the specific service.

10. The method according to claim 9, wherein the DCI with the CRC scrambled with the G-RNTI is configured to indicate a plurality of transmission configuration index (TCI) states at once.

11. The method according to claim 10, further comprising:
transmitting a corresponding physical downlink shared channel (PDSCH) based on each TCI state.

12. The method according to claim 9, wherein the threshold is a configurable parameter determined by the base station, or a value predefined in the wireless communication system.

13. The method according to claim 9, further comprising:
receiving, from the UE, information regarding a best SSB for the UE from among the different SSBs,
wherein the at least one CORESET selected by the UE is associated with the best SSB.

\* \* \* \* \*